(12) United States Patent
Mayhall

(10) Patent No.: US 8,496,229 B1
(45) Date of Patent: Jul. 30, 2013

(54) POWERED FISH TAPE

(76) Inventor: Jonathon A. Mayhall, Ingram, TX (US)

( * ) Notice: Subject to any disclaimer, the term of this patent is extended or adjusted under 35 U.S.C. 154(b) by 0 days.

(21) Appl. No.: 13/402,953

(22) Filed: Feb. 23, 2012

(51) Int. Cl.
*H02G 1/08* (2006.01)
*B66D 1/14* (2006.01)
*B65H 75/38* (2006.01)

(52) U.S. Cl.
USPC ............... 254/134.3 FT; 254/342; 242/405.3

(58) Field of Classification Search
USPC ........... 254/134.3 F, 342; 33/755; 242/405.3, 242/342, 395, 225
See application file for complete search history.

(56) References Cited

U.S. PATENT DOCUMENTS

| | | | | |
|---|---|---|---|---|
| 1,956,806 A | * | 5/1934 | Mitzen et al. | 254/342 |
| 2,718,376 A | * | 9/1955 | Raney | 254/134.3 FT |
| 3,145,972 A | * | 8/1964 | Sweeney | 254/134.3 FT |
| 3,355,148 A | * | 11/1967 | Botello et al. | 254/134.3 R |
| 4,413,808 A | | 11/1983 | Finkle | |
| 4,917,362 A | * | 4/1990 | Wilson | 254/134.3 FT |
| 5,505,432 A | * | 4/1996 | Noonan | 254/134.3 FT |
| 5,588,613 A | * | 12/1996 | Nagy | 242/395 |
| 5,984,273 A | * | 11/1999 | Ray | 254/134.3 R |
| 6,361,021 B1 | * | 3/2002 | Brennan | 254/134.3 FT |
| 6,409,154 B1 | * | 6/2002 | Quinn | 254/134.3 FT |
| RE37,824 E | * | 9/2002 | Pullen | 242/379 |
| 6,513,791 B1 | * | 2/2003 | Yates | 254/134.3 FT |
| 6,722,603 B1 | * | 4/2004 | Atencio | 242/390.8 |
| 7,025,333 B1 | * | 4/2006 | Gianturco | 254/134.3 FT |
| 7,044,415 B2 | * | 5/2006 | Wiesemann et al. | 242/405.3 |
| 7,150,448 B1 | * | 12/2006 | Swift | 254/134.3 FT |
| D553,027 S | | 10/2007 | Weich et al. | D10/74 |
| 7,309,039 B1 | * | 12/2007 | Stone et al. | 242/225 |
| 7,559,154 B2 | * | 7/2009 | Levine et al. | 33/769 |
| 7,600,327 B2 | * | 10/2009 | Sharp | 33/769 |
| 2002/0129510 A1 | * | 9/2002 | Hsieh | 33/761 |
| 2005/0194488 A1 | * | 9/2005 | Radle et al. | 242/395 |

* cited by examiner

*Primary Examiner* — Lee D. Wilson
*Assistant Examiner* — Alvin Grant
(74) *Attorney, Agent, or Firm* — Montgomery Patent & Design; Robert C. Montgomery

(57) ABSTRACT

Taught is a powered fish tape having an integrated electric rewinding mechanism that winds a tape onto a rotating reel using an electric motor. A cross-member is mounted to the rotating reel. A flexible shaft and a mechanical clutch couple the cross-member to the electric motor. The powered fish tape is beneficially powered by a rechargeable battery.

18 Claims, 5 Drawing Sheets

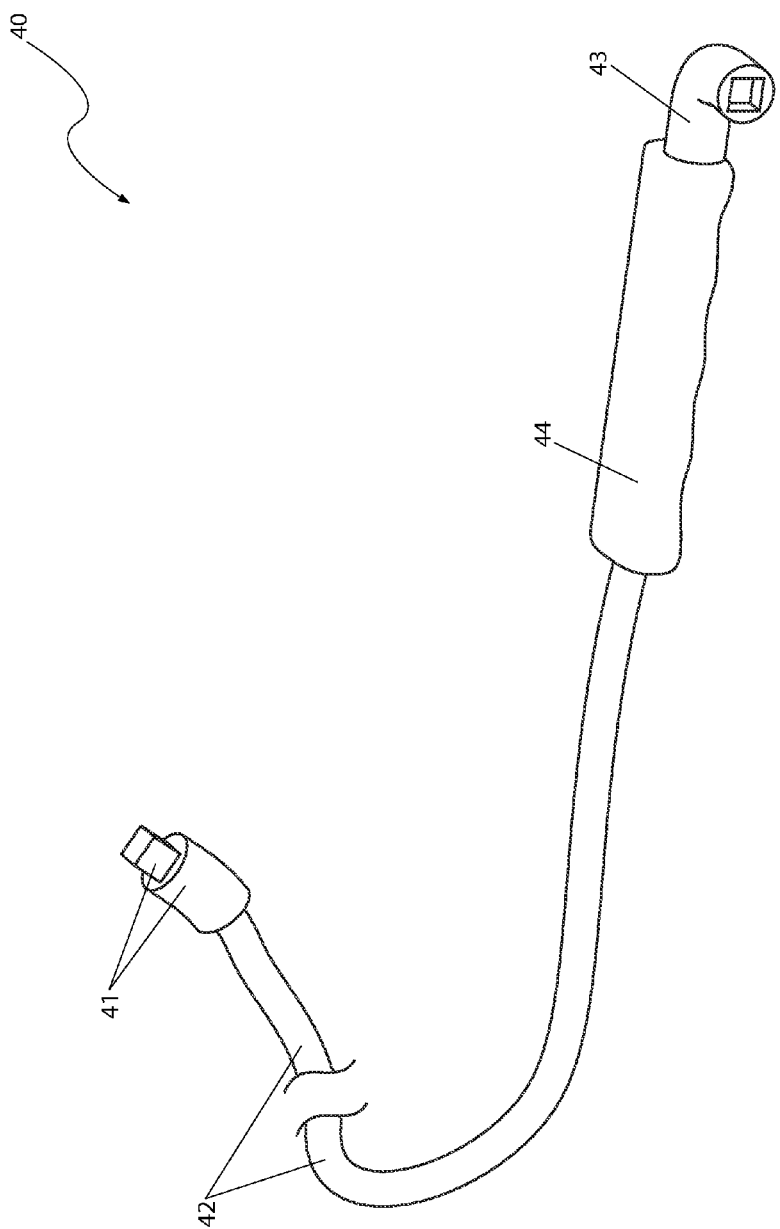

POWERED FISH TAPE

RELATED APPLICATIONS

There are currently no applications co-pending with the present application.

FIELD OF THE INVENTION

The presently disclosed subject matter is directed towards electrician fish tapes. More specifically, the present invention relates to fish tapes having motor-driven rewinding mechanisms.

BACKGROUND OF THE INVENTION

Having the proper tools is critical to a job that is well done. Those who perform physical labor can readily attest that the proper tools can save time and money, produce a higher quality job, increase safety, and reduce damage to equipment and to the job site.

Each field of work has its own specialty tools that perform specialized tasks. Electricians and their helpers often face the specialized but common task of pulling wires or cables through conduits, wall cavities, ceiling cavities, and the like. To do so electricians often employ a fish tape (sometimes called a draw wire or draw tape). A fish tape is a thin, flattened, relatively rigid, continuous steel band that can be pushed and guided (fished) through conduits, wall cavities, ceiling cavities, and the like. Once the end of the fish tape is through, wires or cables are attached to the exposed end. The fish tape is then pulled back through the conduits, wall cavities, ceiling cavities and the like along with the attached wires or cables. When the ends of the wires or cable are exposed they are removed from the fish tape and electrically connected. This process can be repeated as many times are required.

Fish tapes work very well and have been successfully used around the world for many decades. The are tough, rugged, long lasting, easy to use, relatively low in cost, are capable of being used by one person (albeit two (2) people make most jobs much easier). Furthermore, as almost all fish tapes are stored coiled on a reel, hundreds of feet of fish tape can be easily carried and used by unwinding the fish tape from the reel. But, therein lies probably the biggest problem with fish tape. After the fish tape is used and the wire or cable has been pulled there can be literally hundreds of feet of a continuous steel band lying around.

Re-spooling hundreds of feet of fish tape can be both tiring and time consuming. Do it several times a day and your arms and hands can hurt and you lose valuable productive time. Therefore, a need exists for a technique that enables easy and quick rewinding of fish tapes onto reels. Beneficially, such rewinding can be done at reasonable cost by a single person.

SUMMARY OF THE INVENTION

The principles of the present invention provide for a mechanism that can easily and quickly rewind a fish tape onto a reel. Beneficially, those principles can be implemented at reasonable cost and in a manner that enables a single person to rewind the fish tape.

A powered fish tape in accord with the principles of the present invention has an annular hollow hub with an inner perimeter that is formed by a centrally-located, disc-shaped rotating member. The hub includes an opening into its interior. An elongated tape connects at one (1) end to the rotating member and also passes out of the opening. A cross-member attaches to the rotating member such that the rotating member rotates when the cross-member rotates. The cross-member includes a centrally located cross-member driver with a shaft. A motor is coupled to a chuck. A flex drive extension with a coupler driver at one (1) end and a socket at the other is configured such that when the coupler driver rotates the socket also rotates. The chuck connects to the coupler driver while the socket connects to the shaft. When the motor turns the chuck turns the flex drive extension which turns the cross-member which causes the tape to wind onto the rotating member.

Preferably the powered fish tape including a handle that is integrally molded with the hub. The handle beneficially includes a handle grip and a trigger that locks the tape in position. Usefully, at least part of the motor is inside the handle. In practice the motor will be battery-powered. For convenience the battery should form part of an outer surface of the handle. A switch can selectively electrically connect the battery to the motor. The elongated tape should be a thin, flattened, relatively rigid, continuous steel band. The flex drive extension should be removable and of the type that has a rotatable flexible steel cable. To assist a user handle the flex drive a socket grip should be located adjacent the socket.

To reduce operational problems a clutch adjustment preferably couples the motor to the chuck. The clutch adjustment should be used to control the maximum torque that can be applied to the cross member. A plurality of fasteners that pass through apertures can be used to attach the rotating member to the cross-member. While other shapes are possible a square coupler driver is useful. The powered fish tape can further include a battery charger.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
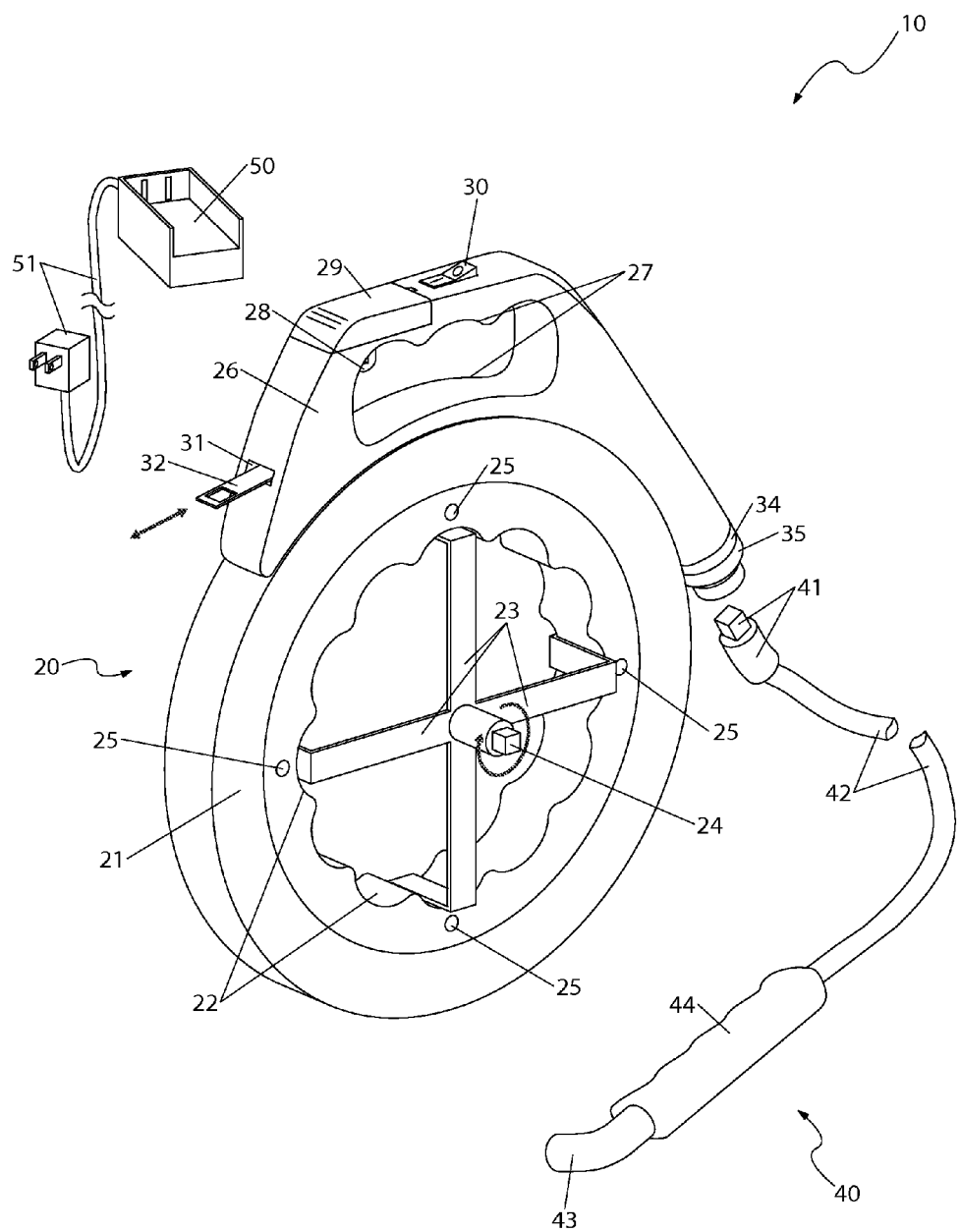
FIG. 1 is a perspective view of a powered fish tape 10 that is in accord with the principles of the present invention.

DESCRIPTIVE KEY 10 powered fish tape
20 housing
21 hub
22 rotating member
23 cross-member
24 cross-member driver
25 fasteners
26 handle
27 handle grip
28 trigger
29 battery
30 switch
31 opening
32 steel tape
33 motor 34 clutch adjustment
35 chuck
36 cross-member aperture
37 reel aperture
38 electrical contacts
40 coupler
41 coupler driver
42 flex drive extension
43 socket
44 socket grip
50 charger
51 power cord

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The preferred embodiment of present invention is herein depicted using FIGS. 1 through 5. Those principles provide for a powered fish tape 10 that assists electricians or similar professionals in routing electrical wire through conduit, cavities, or other openings. The powered fish tape 10 is similar to common electrician fish tapes, yet includes enhanced features that make the powered fish tape 10 easier and faster to use.

FIG. 1 presents a perspective view of a preferred embodiment powered fish tape 10. The powered fish tape 10 has a housing 20 comprising a hollow annular hub 21 and a handle 26. The housing 20 enables a user to handle, use, wind, and unwind an elongated steel tape 32. The powered fish tape 10 also comprises an attachable coupler 40 that is used for rewinding the steel tape 32 using a motor 33 (see FIG. 4). The powered fish tape 10 is used in a conventional manner to unwind the steel tape 32 and to fish it into a desired location. The motor 33 and coupler 40 can then be used to re-wind the steel tape 32.

Figure 2:
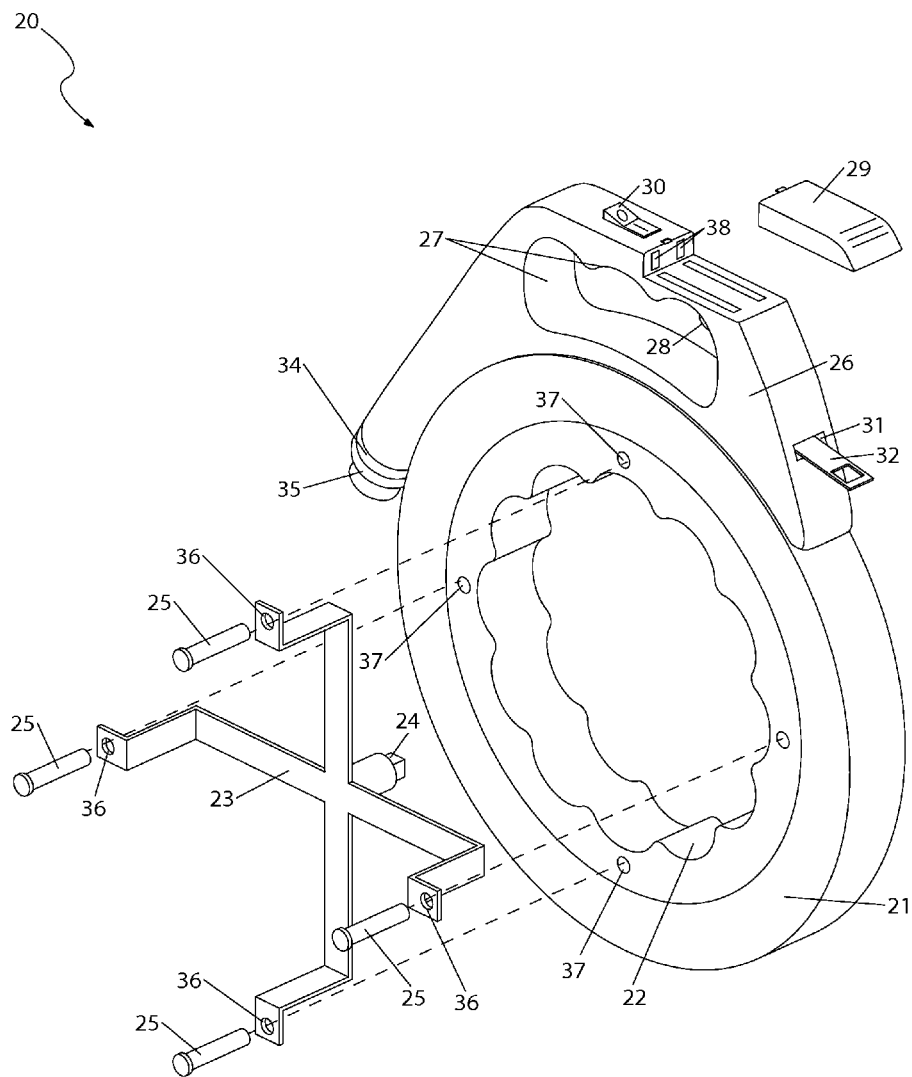
FIG. 2 is an exploded perspective view of a housing 20 of the powered fish tape 10 depicted in FIG. 1.
Figure 3:
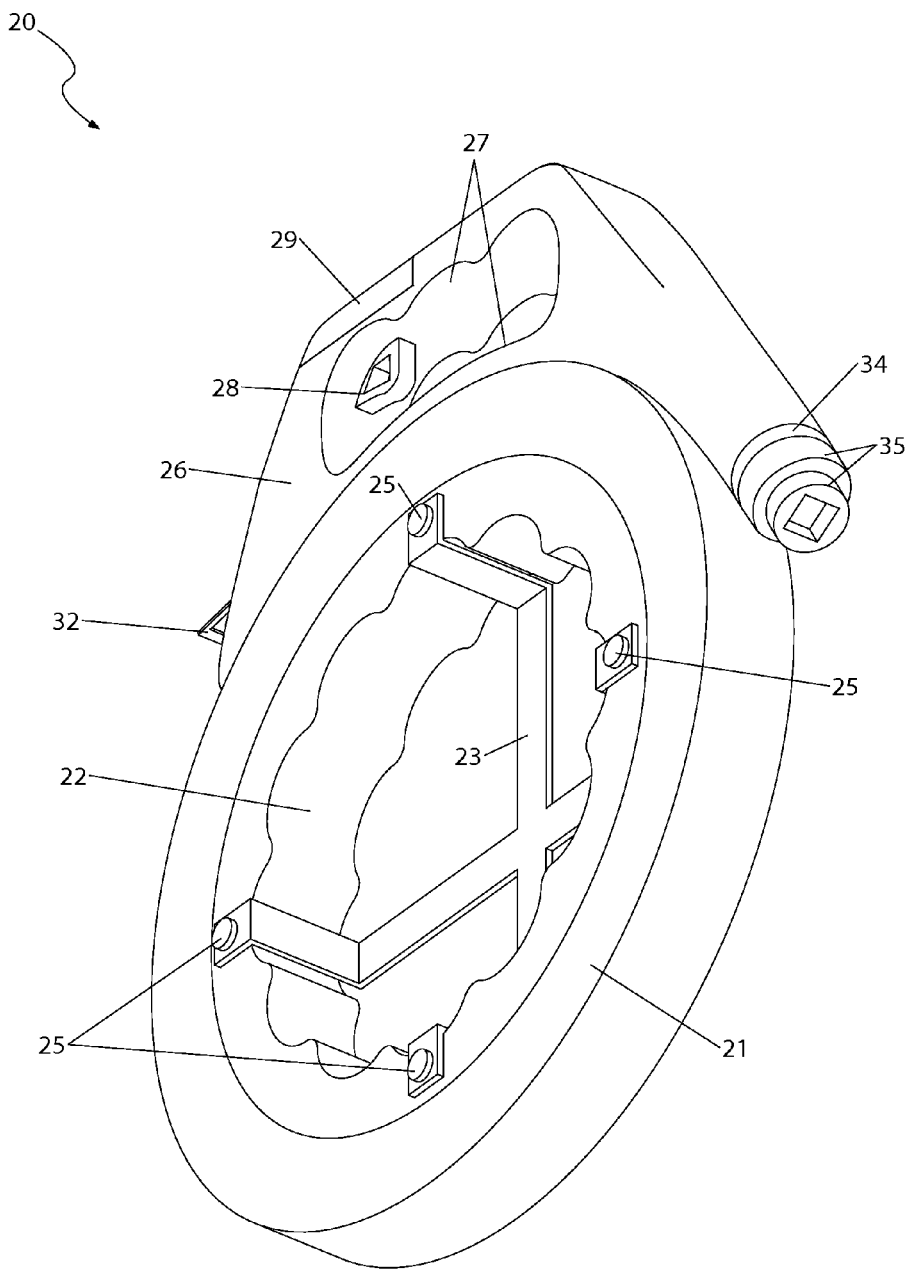
FIG. 3 is another perspective view of the housing 20 shown in FIG. 2.
Figure 4:
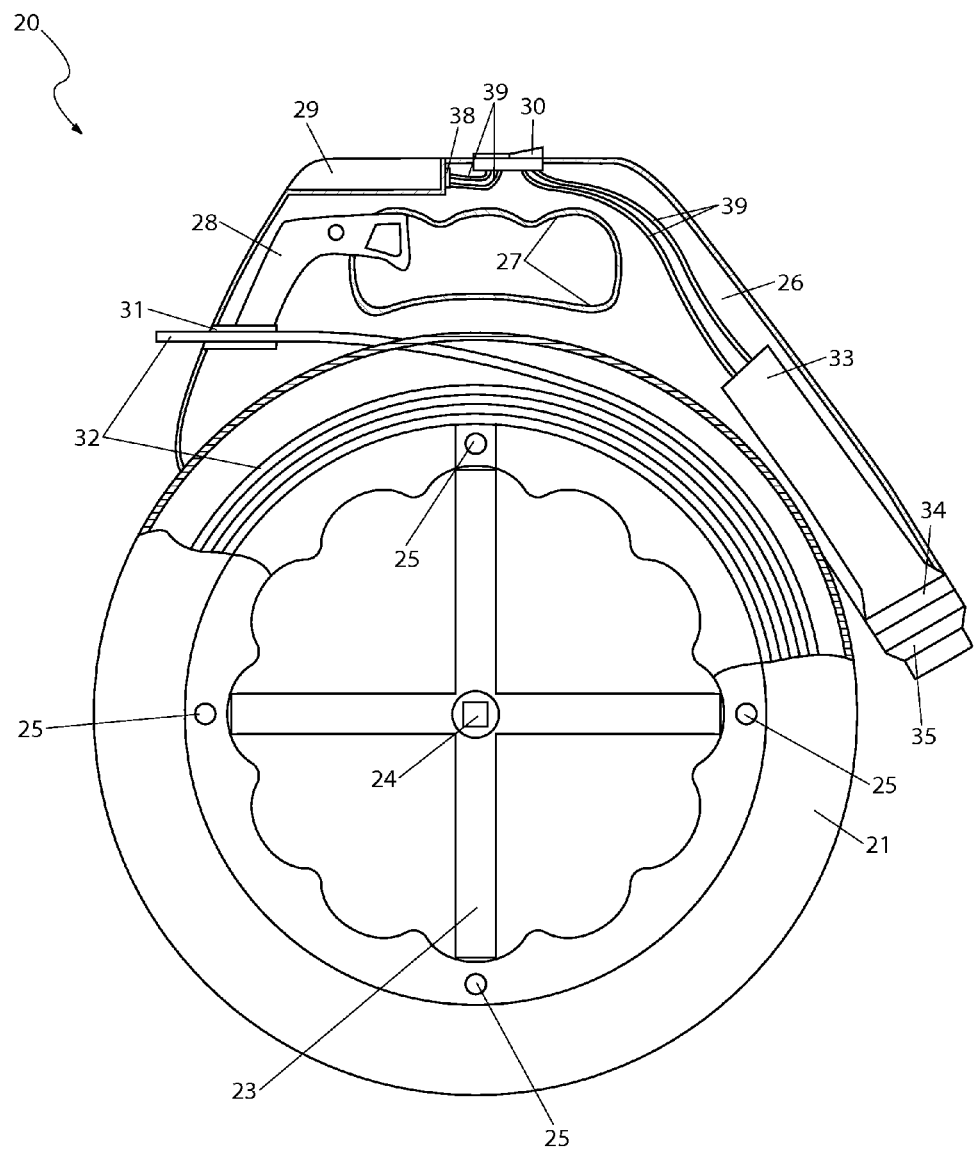
FIG. 4 is a side, partially broken-away view of the housing 20 shown in FIGS. 2 and 3; and, FIG. 5 is a perspective view of a coupler 40 used in the powered fish tape shown in FIG. 1.

Refer now as required to FIG. 2, an exploded perspective view of the housing 20; to FIG. 3 another perspective view of the housing 20; and to FIG. 4 a side, partially broken-away view of the housing 20. The housing 20 includes the hollow annular hub 21 that forms a space for storing the steel tape 32. The hub 21 is beneficially fabricated from a durable plastic. The hub 21 includes both a centrally-located, disc-shaped rotating member 22 that forms its inner perimeter and an opening 31 that enables access to the hub interior. A length of steel tape 32, preferably made from spring steel or a similar material, is wound (coiled) around and connected at one (1) end to the rotating member 22. The other end of the steel tape extends from the opening 31. The steel tape 32 can be unwound and re-wound through the opening 31 from and onto the rotating member 22.

A cross-member 23 is attached to the rotating member 22 to enable connecting the rotating member 22 to the coupler 40. The cross-member 23 is preferably fabricated from a durable metal, yet other materials may be utilized without limiting the scope of the invention. The cross-member 23 is beneficially attached to the rotating member 22 by inserting fasteners 25 through cross-member apertures 36 and into reel apertures 37. The rotating member 22 rotates when the cross-member 23 rotates. A side surface of the cross-member 23 includes a cross-member driver 24 which is comprised of a rectangular shaft which engages a socket 43 (see FIG. 5) of the coupler 40. This enables rotating motion to be applied to the rotating member 22 and to the cross-member 23 as is subsequently described.

The handle 26 is beneficially integrally molded with the hub 21. The handle 26 provides gripping surfaces that enable easy handling of the powered fish tape 10. The handle 26 includes an intermediately positioned ergonomic handle grip 27 that is used for grasping and holding the housing 20. An underside surface of the handle 26 includes a protruding trigger 28 which locks or secures the steel tape 32 in position. An upper portion of the handle 26 includes a rechargeable battery 29 that provides current through a switch 30 to the motor 33. The battery 29 is recharged as needed with a charger 50 (see FIG. 1). The charger 50 includes a power cord 51 which enables the charger 50 to be inserted into a common household circuit. The battery 29 beneficially slides into place to engage the upper surface of the handle 26 and secures via a snap fit to engage a pair of electrical contacts 38. This helps maintain a contoured outer profile of the handle 26. The contacts 38 electrically interconnect the battery 29 to the switch 30 and to the motor 33.

An upper surface of the handle 26 includes a switch 30 which selectively activates and deactivates the motor 33. The switch 30 is depicted as a toggle switch, yet other devices may also be used. The switch 30 is electrically interconnected by electrical wire 39 to the motor 33 and to the contacts 38. The motor 33 is beneficially housed within the handle 26 and provides the powered fish tape 10 with a force to rotate the cross-member 23. The motor 33 is preferably a 12-volt direct current (DC) electric motor. The motor 33 connects to a clutch adjustment 34 that enables a user to adjust the maximum torque that can be applied to the cross-member 23. The clutch adjustment 34 includes a chuck 35 that engages and secures a coupler driver 41 (see FIG. 5) of the coupler 40. The chuck 35 utilizes common methods to retain sockets upon ratchet devices such as a spring-loaded ball bearing; hog ring connector; or the like.

FIG. 5 presents a perspective view of the coupler 40 which is used to rotate the cross-member 23. The coupler 40 includes the coupler driver 41, a flex drive extension 42, and a socket 43. The coupler driver 41 inserts into the chuck 35 as abovementioned. The coupler driver 41 is depicted as a common square driver, yet it is known that other drivers also may be used. The coupler driver 41 is integral to one (1) end of the flex drive extension 42. The flex drive extension 42 is beneficially of the type comprised of an inner flexible steel cable that rotates inside an outer shell. The coupler 40 extends from the chuck 35 to the cross-member driver 24. Opposing the coupler driver 41 is a socket 43 which accepts the cross-member driver 24 on the cross-member 23. Encompassing the socket 43 is a rubberized ergonomic socket grip 44 which a user grasps during use. When the chuck 35 is turned by the motor 33 the flex drive shaft causes the cross-member 23, and thus the rotating member 22 to turn. That causes the steel tape 32 to wind onto the rotating member 22.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the powered fish tape 10 it would be installed as indicated in FIG. 1.

The method of installing and utilizing the powered fish tape 10 may be achieved by performing the following steps: acquiring the powered fish tape 10; charging the battery 29 with the charger 50 as needed; engaging the battery 29 onto the handle 26; unwinding a desired length of fishing tape 32; engaging the coupler device 41 into the chuck 35 and engaging the socket 43 to the cross member driver 24; and, activating the motor 33 with the switch 30 as needed to rotate the rotating member 22 and wind the fishing tape 32.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A powered fish tape, comprising:
   an annular hollow hub with a centrally-located, disc-shaped rotating member that forms an inner perimeter, said hub including an opening into its interior;
   an elongated tape connected to said rotating member at one end, said tape protruding through said opening;
   a cross-member attached to said rotating member such that said rotating member rotates when said cross-member rotates, said cross-member having a centrally located cross member driver with a shaft;
   a motor coupled to a chuck; and,
   a flex drive extension with a coupler driver at one end and a socket at the other, wherein when said coupler driver is rotated said socket rotates;
   wherein said chuck connects to said coupler driver;
   wherein said socket connects to said shaft; and,
   wherein when said motor turns said chuck turns said flex drive extension which turns said cross-member which causes said tape to wind onto said rotating member.

2. The powered fish tape according to claim 1, further including a handle attached to said hub.

3. The powered fish tape according to claim 2, wherein said handle is integrally molded with said hub.

4. The powered fish tape according to claim 2, wherein said handle includes a handle grip.

5. The powered fish tape according to claim 4, wherein said handle includes a trigger that locks said tape in position.

6. The powered fish tape according to claim 2, wherein at least part of said motor is inside said handle.

7. The powered fish tape according to claim 6, further including a battery for powering said motor.

8. The powered fish tape according to claim 7, wherein said battery is attached to said handle so as to form part of an outer surface.

9. The powered fish tape according to claim 7, further including a switch for selectively electrically connecting said battery to said motor.

10. The powered fish tape according to claim 1, wherein said fish tape is a thin, flattened, relatively rigid, continuous steel band.

11. The powered fish tape according to claim 1, wherein said flex drive extension of the tune that has a rotatable flexible steel cable.

12. The powered fish tape according to claim 1, further including a socket grip adjacent said socket.

13. The powered fish tape according to claim 1, further including a clutch adjustment coupling said motor to said chuck.

14. The powered fish tape according to claim 1, wherein said clutch adjustment controls the maximum torque that can be applied to said cross-member.

15. The powered fish tape according to claim 1, wherein said cross-member is attached to said rotating member by a plurality of fasteners passing through cross-member apertures and into reel apertures.

16. The powered fish tape according to claim 1, wherein said coupler driver is square.

17. The powered fish tape according to claim 7, further including a battery charger.

18. The powered fish tape according to claim 1, wherein said flex drive extension is removable.

* * * * *